United States Patent [19]
Prasad et al.

[11] Patent Number: 6,117,210
[45] Date of Patent: *Sep. 12, 2000

[54] SOLID ELECTROLYTE SYSTEMS FOR PRODUCING CONTROLLED PURITY OXYGEN

[75] Inventors: Ravi Prasad, East Amherst; Christian Friedrich Gottzmann, Clarence, both of N.Y.

[73] Assignee: Praxair Technology, Inc., Danbury, Conn.

[*] Notice: This patent issued on a continued prosecution application filed under 37 CFR 1.53(d), and is subject to the twenty year patent term provisions of 35 U.S.C. 154(a)(2).

[21] Appl. No.: 08/848,260

[22] Filed: Apr. 29, 1997

[51] Int. Cl.⁷ .................................................. B01D 53/22
[52] U.S. Cl. .......................................... 95/54; 96/4; 96/10
[58] Field of Search .................. 55/267–269; 95/45, 95/47–54; 96/4, 8, 10, 11; 422/120, 129, 149, 168, 173, 198, 205, 239

[56] References Cited

U.S. PATENT DOCUMENTS

| | | | |
|---|---|---|---|
| Re. 34,595 | 5/1994 | Chen et al. | 95/54 |
| 3,699,032 | 10/1972 | Rapp | 95/54 X |
| 3,735,558 | 5/1973 | Skarstrom et al. | 95/51 |
| 4,235,983 | 11/1980 | Steigelmann et al. | 95/50 X |
| 4,687,578 | 8/1987 | Stookey | 96/10 X |
| 4,718,921 | 1/1988 | Makino et al. | 95/52 |
| 4,783,201 | 11/1988 | Rice et al. | 95/52 |
| 5,035,726 | 7/1991 | Chen et al. | 95/54 |
| 5,067,971 | 11/1991 | Bikson et al. | 95/52 |
| 5,076,823 | 12/1991 | Hansel et al. | 62/22 |
| 5,084,073 | 1/1992 | Prasad | 95/52 |
| 5,160,514 | 11/1992 | Newbold et al. | 95/52 X |
| 5,160,713 | 11/1992 | Mazanec et al. | 423/210 |
| 5,205,842 | 4/1993 | Prasad | 95/47 |
| 5,226,932 | 7/1993 | Prasad | 95/45 |
| 5,259,869 | 11/1993 | Auvil et al. | 95/52 |
| 5,306,411 | 4/1994 | Mazanec et al. | 204/265 |
| 5,332,424 | 7/1994 | Rao et al. | 95/47 |
| 5,354,547 | 10/1994 | Rao et al. | 95/45 X |
| 5,383,956 | 1/1995 | Prasad et al. | 95/45 |
| 5,411,662 | 5/1995 | Nicolas, Jr. et al. | 96/10 X |
| 5,435,836 | 7/1995 | Anand et al. | 95/45 |
| 5,447,555 | 9/1995 | Yee et al. | 95/54 |
| 5,500,036 | 3/1996 | Kalthod | 95/54 |
| 5,525,143 | 6/1996 | Morgan et al. | 95/52 |
| 5,547,494 | 8/1996 | Prasad et al. | 95/54 |
| 5,562,754 | 10/1996 | Kang et al. | 95/54 |
| 5,599,383 | 2/1997 | Dyer et al. | 96/8 |
| 5,605,564 | 2/1997 | Collins | 95/52 |
| 5,611,931 | 3/1997 | Liu et al. | 95/45 X |
| 5,733,435 | 3/1998 | Prasad et al. | 205/765 |

FOREIGN PATENT DOCUMENTS 0732138  9/1996  European Pat. Off. .

OTHER PUBLICATIONS

Zawierucha et al., "Materials and Systems Considerations for Applications Involving Oxygen Enriched Atmospheres", ASME Winter Annual Meeting (1993).
Zawierucha et al., "Flammability of Selected Heat Resistant Alloys in Oxygen Gas Mixtures".
Brochure, "Haynes Alloy No. 25", Union Carbide (1962).
Brochure, "Hastelloy C–22 Alloy", (undated).

*Primary Examiner*—Robert H. Spitzer
*Attorney, Agent, or Firm*—David M. Rosenblum

[57] ABSTRACT

A process for separating a feed gas stream containing elemental oxygen and at least one other gas into an oxygen product gas stream having a selected concentration of oxygen, by removing the oxygen from a feed gas stream using an ion transport module containing an ion transport membrane having a retentate side and a permeate side to produce both an ultrapure oxygen gas stream emerging from the membrane into the permeate side and a retentate gas stream. The ultrapure oxygen gas stream is blended with an additive gas stream to produce an oxygen product gas stream having a selected concentration of oxygen.

16 Claims, 5 Drawing Sheets

SOLID ELECTROLYTE SYSTEMS FOR PRODUCING CONTROLLED PURITY OXYGEN

FIELD OF THE INVENTION

The invention relates to an apparatus and process for separating oxygen from a mixed gas feed stream to produce oxygen of a desired purity and, more particularly, to an apparatus and process utilizing a solid electrolyte ion transport membrane for separating oxygen from air to produce oxygen having a selected purity.

BACKGROUND OF THE INVENTION

Solid electrolyte ionic or mixed ionic-electronic conductors that can rapidly transport oxygen ions have a significant potential for use in air separation. Membranes made of such materials transport only oxygen ions and, therefore, have an infinite selectivity for the permeation of oxygen relative to all other species. This property is of particular advantage in the production of oxygen, since the oxygen product is inherently pure. Conversely, solid electrolyte ion transport materials may also be used to remove oxygen from an air stream to produce an oxygen-free "nitrogen" product.

Air is a mixture of gases which may contain varying amounts of water vapor and, at sea level, has the following approximate composition by volume: oxygen (20.9%), nitrogen (78%), argon (0.94%), with the balance consisting of other trace gases. When a basic solid electrolyte ion transport process is used with air as the feed gas, the minor impurities in the feed air stream (for example, argon, carbon dioxide, water and trace hydrocarbons) are retained in the "nitrogen" retentate.

Therefore, solid electrolyte ionic conductors that transport only oxygen ions appear to be attractive for the separation of oxygen from gas mixtures such as air. These materials, which can be purely ionic conductors or mixed conductors capable of transporting oxygen ions and electrons, are particularly attractive because of their infinite selectivity for oxygen over all other gases. One consequence of this is that the oxygen produced by the solid electrolyte ion transport separator is of ultra high purity (UHP). Ultra high purity oxygen, however, is highly reactive, especially at elevated pressures and temperatures. Thus, the handling of ultra high purity oxygen for transport (for example, with piping), heat transfer, etc., tends to be expensive and often requires the use of special materials. Furthermore, most of the current applications of oxygen require purities of only 90–99% and there is seldom any benefit in increasing the purity to UHP levels and dealing with the increased difficulties of handling UHP oxygen.

In traditional non-cryogenic air separation processes, the concentration of oxygen is kept low and is purified in increments and there is no need to either produce or dilute UHP oxygen. In contrast, the oxygen produced by cryogenic distillation can be very pure (approximately 99.5% pure) and special materials and procedures are typically employed because of the enhanced reactivity of UHP oxygen. The materials that can be used safely in cryogenic processes, therefore, depends on the oxygen concentration encountered. As the oxygen concentration becomes higher, there are only a few special materials that are safe to use. The requirements can be even more severe in solid electrolyte ion transport processes which produce UHP oxygen and which must necessarily operate at a high temperature which usually increases the rate of reaction of oxygen with the materials it is allowed to contact.

Figure 3:
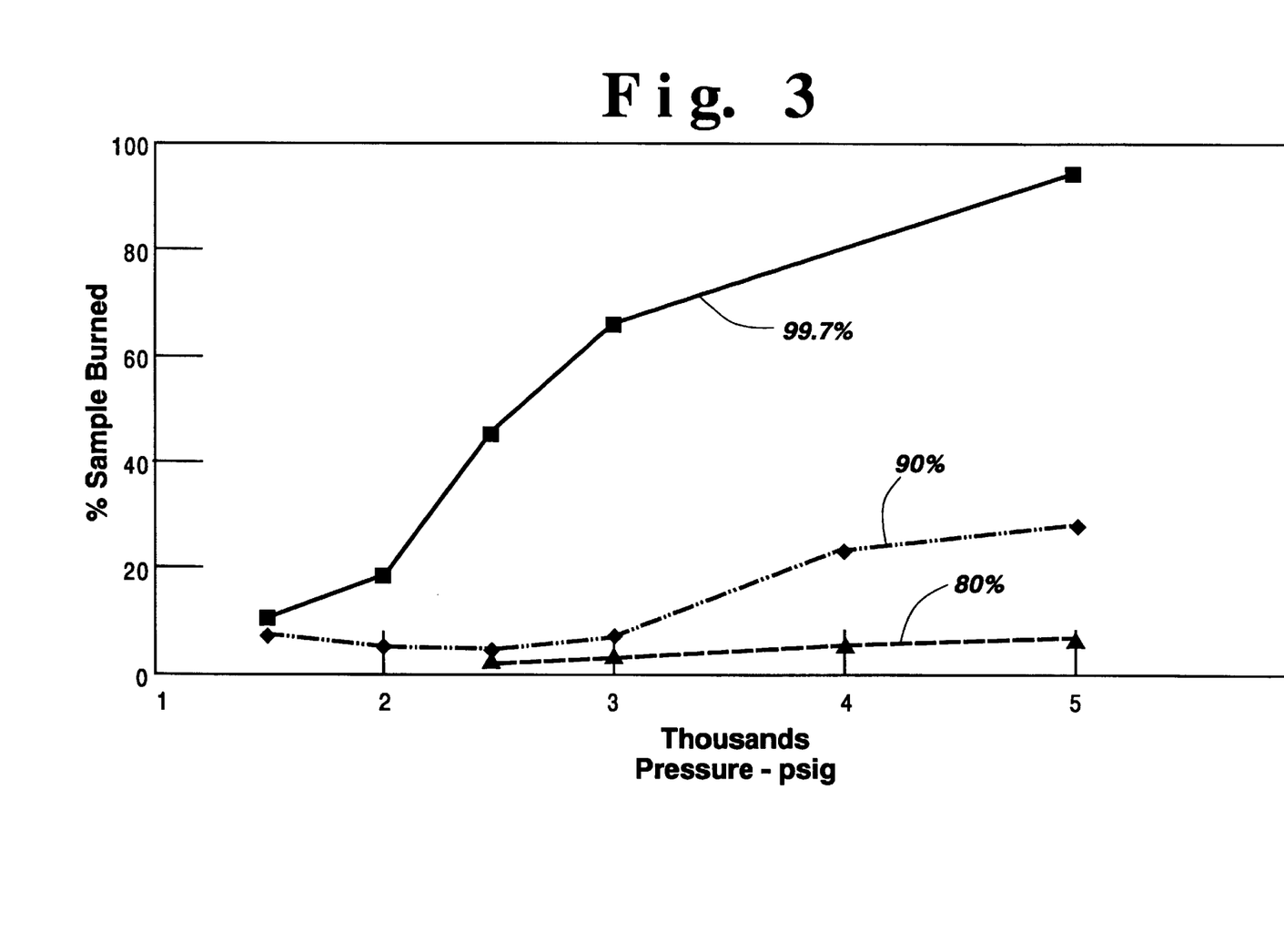
FIG. 3 is a diagram illustrating the ignition-combustion behavior of Haynes alloy No. 25 at various oxygen concentrations and pressure.
Figure 4:
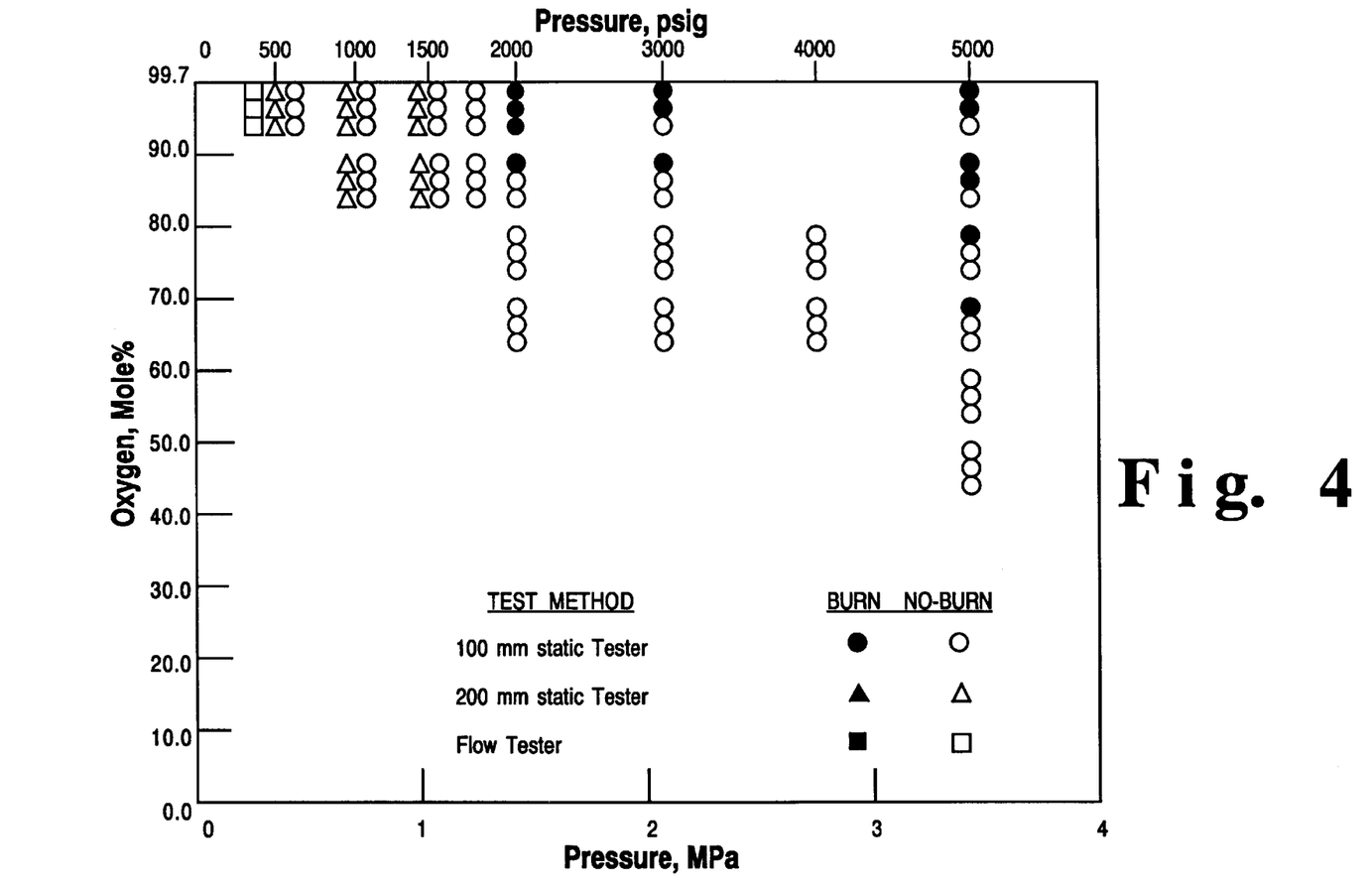
FIG. 4 is a diagram illustrating the ignition-combustion behavior of HASTELLOY® alloy C-22™ at various oxygen concentrations and pressures.

Extensive studies have been made by producers of oxygen by cryogenic distillation to determine which materials are suitable for use in liquids or gases containing high concentrations of oxygen. These studies, which are relevant to the ultra high purity oxygen produced by solid electrolyte ion transport processes, show a very strong dependency of reactivity on the oxygen concentration and the pressure. As the oxygen concentration or the pressure increases, materials are more prone to be oxidized and combusted (that is, oxidized rapidly) and there are fewer materials that can be safely used in such an application. For example, FIG. 3 is a graph showing the ignition-combustion behavior at room temperature of Haynes alloy No. 25, a cobalt-based alloy with high corrosion resistance, at 80%, 90%, and 99.7% oxygen concentrations. It can be seen from the graph that the burning of the Haynes alloy No. 25 sample is promoted dramatically by higher oxygen concentrations. FIG. 4 is a graph showing the flammability data at room temperature for a 3.175 mm (0.125 in) diameter rods of HASTELLOY® alloy C-22™, a nickel-chromium-molybdenum alloy with high corrosion resistance, where combustion only occurred at high oxygen concentration and elevated pressure. Unfortunately, despite the information that can be gleaned from these tests, there are few tests that have been made in the temperature range where solid electrolyte ion transport devices are used, which is generally in excess of 600 C. It is likely that such increased temperatures would make the reactivity problem even more severe. It is evident, however, that decreasing the oxygen concentration from pure oxygen to a lower value decreases the susceptibility of materials in contact with the oxygen to oxidization or combustion.

There are now two types of solid electrolyte ion transport membranes under development: ionic conductors that conduct only ions through the membrane and mixed conductors that conduct both ions and electrons through the membrane. An ion transport membrane exhibiting such mixed conduction characteristics can transport oxygen when subjected to a differential partial pressure of oxygen across the membrane without the need for an applied electric field or external electrodes which would be necessary with the ionic conductors. As used herein, the terms "solid electrolyte ionic conductor", "solid electrolyte ion transport system", or simply "solid electrolyte" or "ion transport membrane" is used to designate either a system using ionic-type system or a mixed conductor-type system unless otherwise specified.

Solid electrolyte ion transport technology is described in more detail in Prasad et al., U.S. Pat. No. 5,547,494, entitled *Staged Electrolyte Membrane,* which is hereby incorporated by reference to more fully describe the state of the art.

In the absence of a purge stream, the "permeate" stream that carries the oxygen away from the ion transport membrane is "pure" oxygen. For mixed conduction membranes both the feed and the retentate streams must be at a high pressure (or the "permeate" stream at a very low pressure) to create a driving force for the oxygen transport. While such an unpurged membrane is attractive for the removal of larger quantities of oxygen from inert gas streams, the oxygen recovery is limited by pressures that can be applied.

The inventors are unaware of any prior art describing the dilution of oxygen produced by a solid electrolyte ion transport process. The following references concern the oxidation resistance of materials as a function of pressure and oxygen concentration: R. Zawierucha, K. McIlroy, and J. F. Million, *Flammability of Selected Heat Resistant Alloys in Oxygen Gas Mixtures,* Proceedings of the 2nd International Conference on Heat-Resistant Materials, Gatlinburg, Tenn., September 1995, pp. 97–103; and R. Zawierucha, R.

F. Drnevich, D. E. White and K. McIlroy, *Materials and Systems Considerations for Applications Involving Oxygen Enriched Atmospheres,* Presented at the ASME Winter Annual Meeting, New Orleans, La., December 1993.

Chen et al., U.S. Pat. No. Re. 34,595 (reissue of U.S. Pat. No. 5,035,726), entitled *Process for Removing Oxygen and Nitrogen from Crude Argon,* relates to the use of electrically-driven solid electrolyte membranes for the removal of low levels of oxygen from crude argon gas streams. Chen et al. estimate the electrical power needed for several examples of multistage processes and also mention the possibility of using mixed conductor membranes operated by maintaining an oxygen pressure on the feed side. Chen et al. further teach that oxygen exiting from the permeate side of an electrically-driven ionic membrane may either be removed as a pure oxygen stream or mixed with a suitable "sweep" gas such as nitrogen.

Mazanec et al., U.S. Pat. No. 5,160,713 entitled *Process for Separating Oxygen from an Oxygen-Containing Gas by Using a Bi-Containing Mixed Metal Oxide Membrane,* relates to an oxygen separation process employing a bismuth-containing mixed metal oxide membrane which generally provides that the separated oxygen can be collected for recovery or reacted with an oxygen-consuming substance. The oxygen-depleted retentate is apparently discarded.

Mazanec et al., U.S. Pat. No. 5,306,411, entitled *Solid Multi-Component Membranes, Electrochemical Reactor Components, Electrochemical Reactors and Use of Membranes, Reactor Components, and Reactor for Oxidation Reactions,* relates to a number of uses of a solid electrolyte membrane in an electrochemical reactor. It is mentioned that nitrous oxides and sulfur oxides in flue or exhaust gases can be converted into nitrogen gas and elemental sulfur, respectively, and that a reactant gas such as light hydrocarbon gas can be mixed with an inert diluent gas which does not interfere with the desired reaction, although the reason for providing such a mixture is not stated. Neither of the Mazanec et al. patents cited disclose processes to produce a purified product from an oxygen-containing gas stream.

OBJECTS OF THE INVENTION

It is therefore an object of the invention to provide an efficient process of purifying an oxygen-containing gas using a solid electrolyte ion transport membrane for making high purity oxygen, and to dilute such ultra high purity oxygen by controlled addition of the retentate gas from the solid electrolyte ion transport membrane or a reactive gas to the ultra high purity oxygen or a diluent from another source.

Another object of this invention is to provide a simple and practical means for slightly diluting the ultra high purity oxygen produced by ion transport processes so that the product oxygen can be safely and more conveniently handled.

It is a further object of the invention to preferably increase the efficiency of the process by using such added gases to purge the permeate side of the solid electrolyte ion transport membrane.

SUMMARY OF THE INVENTION

The invention comprises a process for separating a feed gas stream containing elemental oxygen and at least one other gas into an oxygen product gas stream having a selected concentration of oxygen. The process comprises removing the oxygen from a feed gas stream using an ion transport module containing an ion transport membrane having a retentate side and a permeate side to produce both an ultrapure oxygen gas stream emerging from the membrane into the permeate side and a retentate gas stream, and blending the ultrapure oxygen gas stream with an additive gas stream to produce an oxygen product gas stream having a selected concentration of oxygen.

In a preferred embodiment of the invention, the feed gas stream is air. In another preferred embodiment of the invention, the diluted oxygen product gas stream has a selected concentration from 80% to 99.9% oxygen by volume. In yet another preferred embodiment of the invention, the blending occurs at one or more points between the point at which the oxygen permeates through the ion transport membrane and the point at which the oxygen product gas stream is used. In another preferred embodiment of the invention, the additive gas stream for blending comprises at least a portion of the retentate gas stream. In other preferred embodiments of the invention, the additive gas stream for blending is provided through one or more conduits, a porous material, or a membrane that is selectively permeable to at least a portion of the retentate gas stream, to allow at least a portion of the retentate gas stream to blend with the ultrapure oxygen gas stream upon or after emergence of the ultrapure oxygen gas stream. In some cases the porous material is in contact with the ion transport membrane or is dispersed in the ion transport membrane.

In further preferred embodiments of the invention, the additive gas stream for blending is provided through imperfect seals on at least one end of the ion transport membrane and may allow the additive gas stream for blending to comprise at least a portion of the retentate gas stream. In yet further embodiments of the invention, the additive gas stream for blending comprises at least a portion of the feed gas stream, an inert gas stream, or a nitrogen gas stream. In other embodiments of the invention, the additive gas stream for blending is a reactive gas stream that reacts with the ultrapure oxygen gas stream to produce the diluted oxygen product gas stream having a selected concentration of oxygen which may be done such that it purges the permeate side of the ion transport membrane and enhances the efficiency of the solid electrolyte.

In an embodiment of the invention, the process further comprises transferring heat from the diluted oxygen permeate gas stream and the retentate gas stream to the feed gas stream to produce a warmed feed gas stream and heating the warmed feed gas stream to produce the hot feed gas stream. In another embodiment of the invention, the process additionally comprises compressing the feed gas to produce a compressed feed gas stream.

BRIEF DESCRIPTION OF THE DRAWINGS

Other objects, features and advantages of the invention will occur to those skilled in the art from the following description of preferred embodiments and the accompanying drawings, in which.

DETAILED DESCRIPTION OF THE INVENTION

This invention therefore relates to the production and dilution of UHP oxygen for safety and ease of handling at elevated temperatures, more particularly, those typically encountered during the operation of solid electrolyte ion transport devices. Such dilution or blending may occur at the permeate side of the ion transport membrane, the proximate end of the ion transport membrane (near the feed gas stream entrance to the ion transport module) or near the distal end of the ion transport membrane, outside the ion transport module, or at any point between the point at which the oxygen permeates through the ion transport membrane and the point at which the oxygen product gas stream is used. It should be noted that the difficulties of handling UHP oxygen at high temperatures are ameliorated by immediately diluting the UHP oxygen inherently produced by the solid electrolyte ion transport process. As a concomitant advantage, the solid electrolyte ion transport separation process is also enhanced when the diluent is used as a reflux stream for the ion transport membrane, that is, the power requirements for the system are reduced. Thus, the essence of the invention is to dilute the oxygen permeate of the ion transport separation process to produce a slightly impure oxygen product that is safer and easier to handle at high temperatures but whose purity is sufficient for the intended application.

Figure 1:
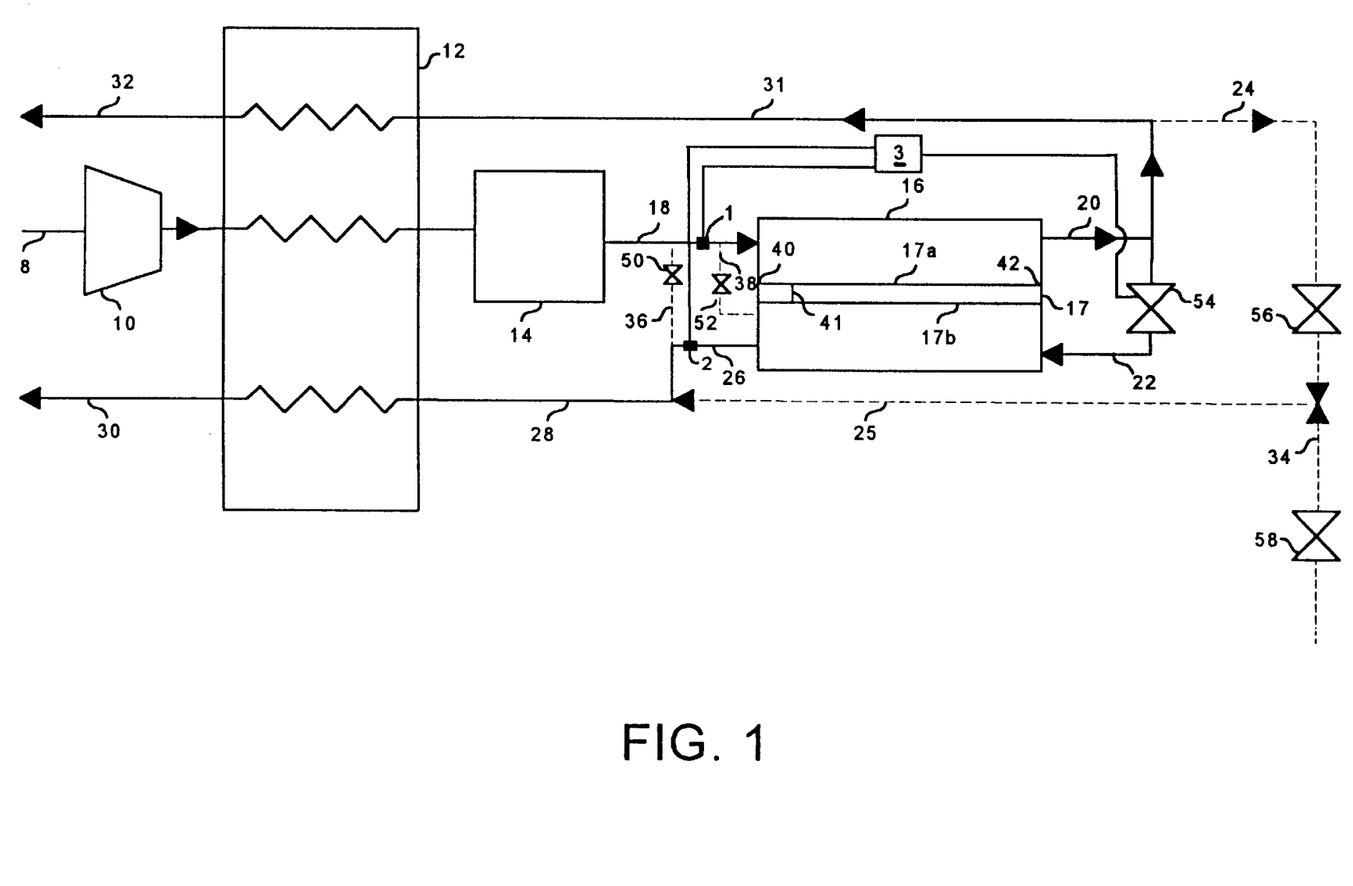
FIG. 1 is a schematic diagram illustrating an example of a system according to the invention using a solid electrolyte ion transport separator module having heated air flowing along one side of the solid electrolyte ion transport membrane allowing permeation of oxygen to the other side of the membrane, the oxygen being diluted by at least one of reflux, an internal diluent, and an external diluent.

The basic invention is illustrated in FIG. 1. During operation, ambient feed gas stream 8 is compressed by compressor 10 and then passed through heat exchanger 12, where it is warmed against oxygen product gas stream 30 and nitrogen waste stream 32 and then heated further in trim heater 14 to a temperature in excess of 400 C.; preferably 400–1200 C.; more preferably 600–100 C. Hot feed gas stream 18 then enters ion transport separator module 16 and flows along one side of ion transport membrane 17 which has a retentate side 17a and a permeate side 17b. Ion transport membrane 17 has a proximate end 40 and a distal end 42. Ion transport membrane 17 is preferably composed of a solid oxide that conducts both oxygen ion vacancies and electrons. Such a membrane will allow only oxygen to permeate from the retentate side 17a to the permeate side 17b of ion transport membrane 17. In the absence of a purge or reflux, the permeated oxygen will be of ultra high purity (UHP). This could be taken as the product gas stream but special materials would be required to handle this stream safely.

One method of controlling the degree of dilution of impure oxygen gas stream 26 is to monitor hot feed gas stream 18 using optional sensor 1 and impure oxygen gas stream 26 using optional sensor 2. In such an embodiment, optional sensors 1 and 2 and valve 54 are electrically connected to optional microprocessor 3. Optional microprocessor 3 dynamically controls and adjusts the operation of valve 54 in response to the information received from optional sensors 1 and 2 to obtain impure oxygen gas stream 26 of a selected purity. Such a method of adjusting reflux by controlling the operation of a valve using sensors and a microprocessor is disclosed, for example, in Prasad et al., U.S. Pat. No. 5,837,125, entitled *Reactive Purge for Solid Electrolyte Membrane Gas Separation,* issued Nov. 17, 1998, which is hereby incorporated by reference.

In FIG. 1, the pressurized retentate gas stream 20 will be depleted in oxygen and, if the feed gas stream 8 is air, will consist principally of nitrogen. This retentate gas stream 20 would normally be conducted back through the heat exchanger 12 and discharged as a waste stream 32, possibly after expansion through a turbine to produce power. In this invention, a small portion of the nitrogen-rich retentate stream 20 passes through valve 54 and this gas stream 22 is combined with the oxygen permeate to produce a slightly impure oxygen gas stream 26. As mentioned above, valve 54 can be controlled by optional microprocessor 3. Alternately, this dilution can be achieved by blending the oxygen permeate gas stream 26 and the nitrogen gas stream 25 (shown in phantom) outside of the ion transport separator module 16 to form a blended stream 28. Another method of dilution would include using an outside gas stream which is passed through valve 58 to successively become gas stream 34 and gas stream 25 (both shown in phantom), which is blended with the oxygen permeate gas stream 26. Yet another method of dilution would include using gas stream 36 (shown in phantom), which is taken from hot feed gas stream 18 and passed through valve 50, to blend with the oxygen permeate gas stream 26. Another method of dilution would include using gas stream 38 (shown in phantom), which is taken from hot feed gas stream 18 and passed through valve 52, to blend with the oxygen permeate gas stream emerging from the permeate side 17b of the ion transport membrane 17. The preferred range of oxygen concentration after dilution is 80.0–99.9% and, more preferably, 90.0–99.7%.

It is preferable, however, to use the portion of the nitrogen-rich retentate gas stream 20 as a purge stream 22 to reflux the permeate side 17b of the ion transport membrane 17. For oxygen transport to occur, the oxygen partial pressure on the retentate side 17a of the ion transport membrane 17 must exceed that on the permeate side 17b of the ion transport membrane 17, as expressed by the inequality:

$$p_1 Y_1 > p_2 Y_2 \tag{1}$$

where $p_1$ is the total pressure on the retentate side of the membrane; $p_2$ is the total pressure on the permeate side of the membrane; $Y_1$ is the mole fraction of oxygen on the retentate side of the membrane; and $Y_2$ is the mole fraction of oxygen on the permeate pressure side of the membrane. This employs the well-known thermodynamic principle that a difference in concentration of a species across a membrane will result in a chemical potential across that membrane. This condition must prevail everywhere in the ion transport separator module 16 for the separation process to operate throughout the ion transport membrane 17. When no reflux gas stream is used, the permeate gas is pure oxygen ($Y_2=1$) and the driving force through the membrane will vanish when $Y_1$ becomes sufficiently small, assuming the pressures $p_1$ and $p_2$ remain relatively constant. When some of the retentate nitrogen gas stream 20 is used as a reflux or purge stream 22 to purge the permeate side 17b of the ion transport membrane 17, however, the value of $Y_2$ is reduced at the retentate output end of the ion transport separator module 16, thereby allowing more of the oxygen in the hot feed gas stream 18 to permeate through the ion transport membrane 17.

Therefore, use of this reflux or purge method increases the efficiency of the process. The extracted permeate gas stream 26, however, is no longer pure oxygen but is diluted by the amount of nitrogen that was used to reflux the ion transport membrane 17. As mentioned previously, this dilution is usually desirable as the handling of the extracted permeate stream 26 is now simpler since this gas is no longer UHP oxygen. Subsequently, the permeate gas stream 26 and the residual retentate stream 31 are cooled in the heat exchanger 12 against the feed gas stream 8 after compression by compressor 10. The now cooled and diluted oxygen product gas stream 30 is withdrawn as the final product and the residual nitrogen retentate gas stream 32 is discharged as a waste stream.

In practice, the dilution of the high purity oxygen stream can be achieved in many ways. The dilution may be accomplished internally (that is, within the ion transport module) or externally. Preferably such dilution occurs before the diluted product gas stream passes through a downstream component, most preferably the gas stream is diluted before it emerges from the ion transport module.

One particularly convenient way of diluting the oxygen gas stream would be to use less than perfect seals at the proximate end 40 or the distal end 42 of the ion transport separator module 16 so that a portion of the retentate nitrogen gas stream 20 and/or the hot feed gas stream 18 intentionally leaks into the permeate side 17b of the ion transport membrane 17 to dilute the oxygen permeate gas stream. The preferred location of the leak depends on the design of the ion transport separator module 16. If the hot feed gas stream 18 and the permeate gas stream 26 flow countercurrently to each other, it is preferable to have the leak from the retentate side 17a of the ion transport membrane 17 to the permeate side 17b of the ion transport membrane 17. If the hot feed gas stream 18 and the permeate gas stream 26 have a concurrent flow geometry, it is preferable to have the leak from the hot feed gas stream 18 to the permeate side 17b of the ion transport membrane 17. If the hot feed gas stream 18 and the permeate gas stream 26 have a "crossflow" flow geometry, the leak may be at either the proximate end 40, the distal end 42, or both ends of the ion transport separator module 16. It should be noted that a benefit of imperfect or "leaky" seals is that they are easier to make than perfect leak-proof seals. Most seals made with packing and some seals made with o-rings permit some bypassing of the gas stream from the retentate side to the permeate side of the ion transport separator module 16. At times sliding seals are employed to accommodate differential expansion. Since this seal typically experiences more leakage, it should be placed on the upstream side of the anode, that is, at the proximate end 40, near the feed gas stream entrance to the ion transport module 16.

Figure 2A:
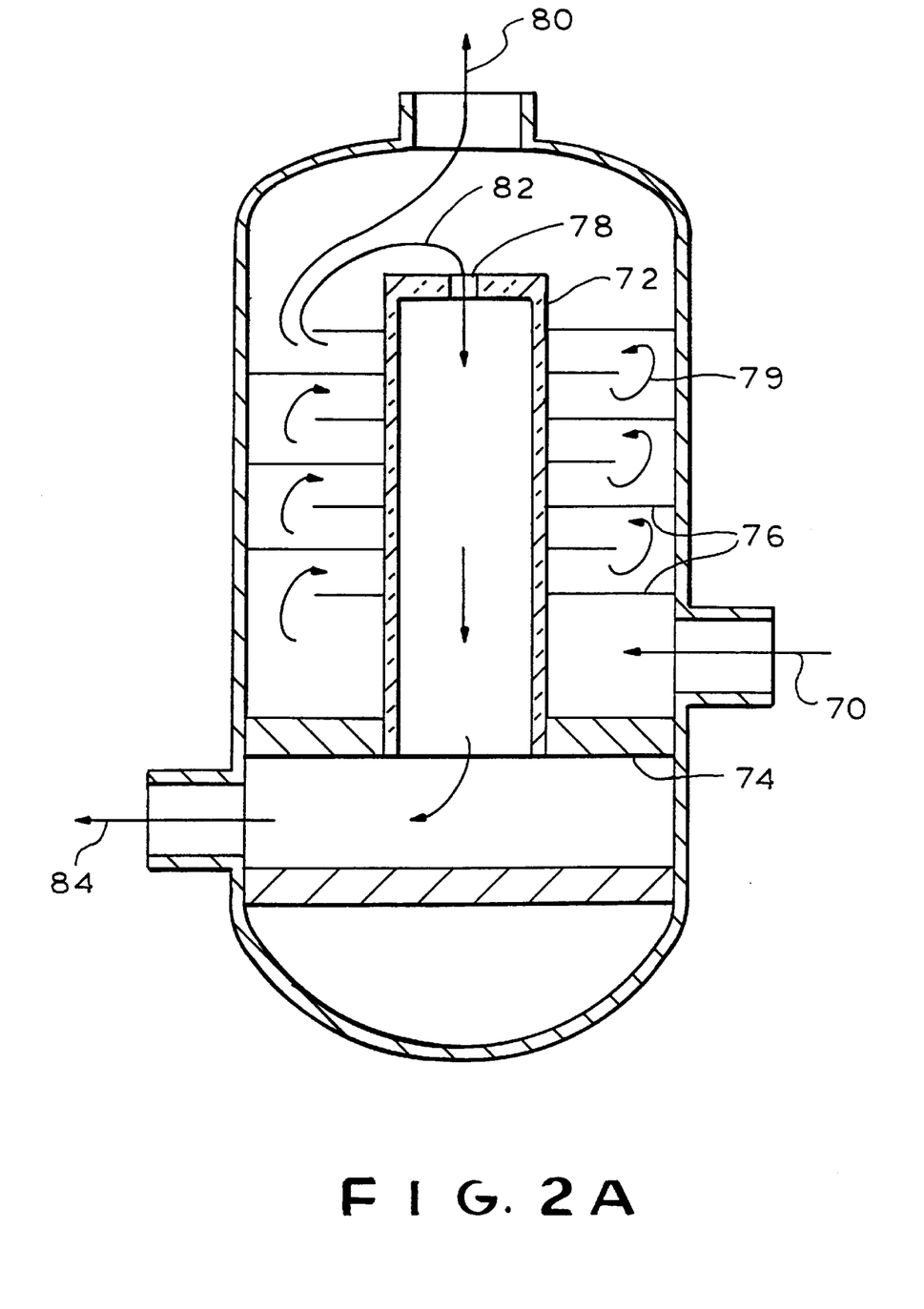
FIG. 2A is a schematic diagram illustrating an example of an apparatus employing a solid electrolyte ion transport separator membrane for separating oxygen gas from an oxygen-containing feed gas stream and a metering orifice for subsequently diluting the oxygen gas stream with the oxygen-depleted retentate gas stream.

FIG. 2A is a schematic diagram illustrating dilution method using an apparatus employing a solid electrolyte ion transport separator membrane for separating oxygen gas from an oxygen-containing feed gas stream and a metering orifice for subsequently diluting the oxygen gas stream with the oxygen-depleted retentate gas stream. This apparatus essentially accomplishes the functions of ion transport module 16 and the directing of retentate gas purge stream 22 for dilution of FIG. 1 in one apparatus. During operation, a feed gas stream 70 is directed by baffles 76 to flow across the outside of ion transport tube 72 where oxygen is removed and the gas stream becomes oxygen-depleted. Ion transport tube 72 is supported on one end by tube sheet 74 and is capped and free-floating on the other end. The capped end of the ion transport tube 72 has an orifice 78 of a selected diameter. While most of the oxygen-depleted retentate gas stream 79 exits the apparatus as retentate gas stream 80, retentate purge gas stream 82 passes through orifice 78 to purge the permeate (interior) side of the ion transport tube 72 and produce controlled purity oxygen product gas stream 84 which exits the apparatus.

The size of the orifice 78 as well as the flow rate and pressures of the gas streams involved determines the amount of oxygen dilution. For a typical application of the instant invention, a gas turbine with co-product having a desired oxygen gas purity of 95%, the parameters would typically be as follows:

Retentate gas stream 79 pressure: 200 psia

Permeate gas stream 84 pressure: 20 psia

Ion transport tube 72 dimensions: 0.75 O.D.×20 ft.

Ion transport tube 72 operating temperature: 1652 F.

Retentate gas stream 80 oxygen content: 13%

Avg. $O_2$ flux through ion transport tube 72: 10 NCFH/ft$^2$

Orifice 78 coefficient: 0.95

From this information, the diluent gas stream 82 flow rate can be calculated as 0.238 NCFH per ion transport tube 72. From the well-known orifice equation, the required orifice 78 diameter is found to be 0.0133 in.

Figure 2B:
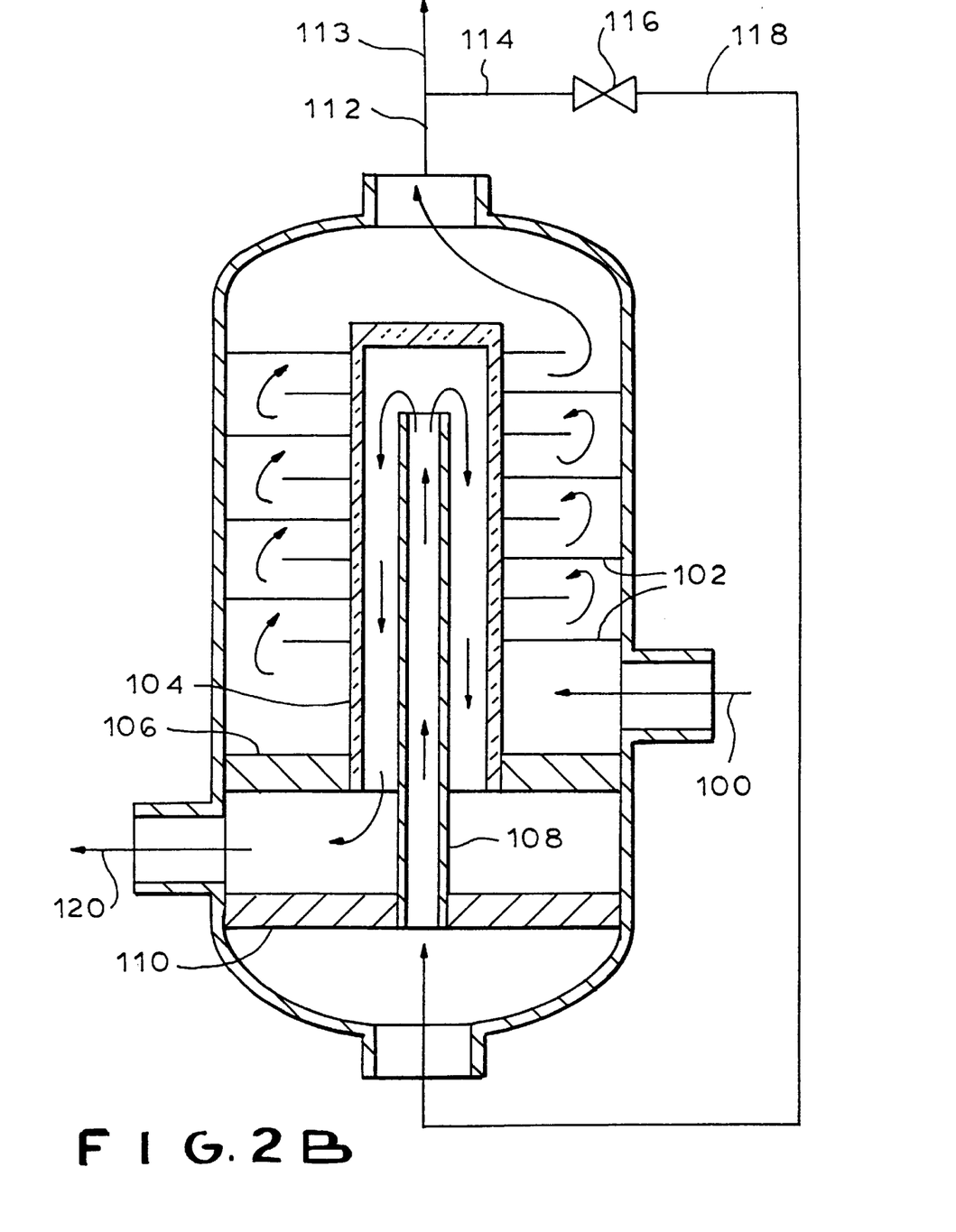
FIG. 2B is a schematic diagram illustrating an example of an apparatus employing a solid electrolyte ion transport separator membrane for separating oxygen gas from an oxygen-containing feed gas stream with an oxygen-depleted retentate gas stream purge.

Alternative dilution arrangements and apparatuses are possible. FIG. 2B is a schematic diagram illustrating an example of an apparatus employing a solid electrolyte ion transport separator membrane for separating oxygen gas from an oxygen-containing feed gas stream with a oxygen-depleted retentate gas stream purge. As with FIG. 2A, this apparatus essentially accomplishes the functions of ion transport module 16 and the directing of retentate gas purge stream 22 for dilution of FIG. 1 in one apparatus. During operation, a feed gas stream 100 is directed by baffles 102 to flow across the outside of ion transport tube 104 where oxygen is removed and the gas stream becomes oxygen-depleted. Ion transport tube 104 is supported on one end by tube sheet 106 and is capped and free-floating on the other end. The oxygen-depleted retentate gas stream 112 exits the apparatus and is divided into two portions: retentate gas stream 113, which is discarded or recovered as a co-product, and retentate gas stream 114 which passes through valve 116 to become purge gas stream 118 which is fed back into the apparatus as shown. Although not shown, retentate gas stream 114 is typically cooled in a heat exchanger before it passes through valve 116 in order to allow valve 116 to be made of less expensive materials designed for lower temperatures. In such a case, purge gas stream 118 is heated before it is fed into the apparatus. Purge gas stream 118 is fed into the interior of ion transport tube 104 using purge feed tube 108 supported by tube sheet 110 to purge the permeate side of the ion transport tube 104 and produce controlled purity oxygen product gas stream 120 which exits the apparatus.

Yet another dilution method according to this invention uses a ceramic or other material that is permeable to at least a portion of the retentate gas or otherwise allows the passage of the retentate gas to the permeate side 17b of the ion transport membrane 17, in selected areas near or in the ion transport membrane 17. This would allow some retentate gas to permeate through or otherwise pass to the permeate side 17b of the ion transport membrane 17. Such material may be dispersed uniformly throughout the ion transport membrane 17 or only in selected areas of the ion transport membrane 17. This retentate-gas-permeable material could instead be used in some areas outside the ion transport membrane 17. Alternately, small holes or conduits, such as conduit 41, could be provided in the ion transport membrane 17 or in the areas near the ion transport membrane 17 to allow some of the retentate gas to pass into the UHP oxygen permeate. A combination of these permeation or transport means could also be used if desired.

The preferred mode of the invention is to use a portion of the nitrogen-rich retentate gas stream 20 as a purge gas stream 22 to reflux the permeate side 17b of the ion transport membrane 17, as shown in FIG. 1.

An alternative mode of practicing the invention is to use a portion of the extracted nitrogen-rich retentate 20 as a diluent gas stream 24 which passes through valve 56, becomes the gas stream 25, and is blended with the extracted permeate stream 26. While not as advantageous as the preferred mode of operation, this means could be used where it is impractical to reflux the ion transport membrane 17 as, for example, when the ion transport separator module 16 is a 3-port device. The object of the invention being to dilute the oxygen, the alternative mode could use any diluent gas from an external source that is compatible with the final oxygen product requirements, rather than using the nitrogen-rich retentate.

Another alternative is to use a reflux stream that contains a fuel species that can react with some of the oxygen permeated through the ion transport membrane 17. The products of such combustion dilute the final oxygen product gas stream to a suitable level. For example, the addition of 1% methane to the pure oxygen stream will produce water and carbon dioxide that dilute the oxygen gas stream 26 to 97% oxygen. The use of a "reactive diluent" also serves to produce heat that can supplement the heating requirement of the ion transport separator module 16. The reduced oxygen concentration also somewhat enhances the oxygen flux through the ion transport membrane 17 in the region where the combustion occurs.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

The hot feed gas stream 18 to the ion transport separator module 16 may be any gas containing elemental oxygen. In general, however, the hot feed gas stream 18 to the ion transport separator module 16 would have a preferred range of 79–97% nitrogen (more correctly, oxygen-free gas), that is, 3–21% oxygen; the more preferred range being 79–92% nitrogen (oxygen-free gas), that is, 8–21% oxygen.

As mentioned above, the terms "solid electrolyte ionic conductor", "solid electrolyte ion transport membrane", "solid electrolyte", or "ion transport membrane" are generally used herein to designate either an ionic-type (electrically-driven) system or a mixed conductor-type (pressure-driven) system unless otherwise specified.

The term "nitrogen" as used herein usually means oxygen-depleted gas, that is, oxygen-depleted relative to the feed gas. As discussed above, the ion transport membrane only allows oxygen permeation. Therefore, the composition of the retentate will depend on the composition of the feed gas. The feed gas will be depleted of oxygen but will retain nitrogen and any other gases (for example, argon) present in the feed gas. The meaning of the term will be clear to one of skill in the art in the context of the use of the term in light of the invention as disclosed herein.

As used herein the term "elemental oxygen" means any oxygen that is uncombined with any other element in the Periodic Table. While typically in diatonic form, elemental oxygen includes single oxygen atoms, triatomic ozone, and other forms uncombined with other elements.

The term "high purity" refers to a gas stream which contains less than five percent by volume of undesired gases. Preferably the gas stream is at least 99.0% pure, more preferably 99.9% pure, and most preferably at least 99.99% pure, where "pure" indicates an absence of undesired gases.

As used herein the term "downstream component" or "downstream element" means apparatus through which a gas stream flows after emerging from the ion transport module. An example of a downstream component may be a heat exchanger.

Many alternative variations of physical elements such as inter-system and inter-stage heat exchangers, inter-coolers, heaters, etc., may be used in any appropriate fashion in this invention. The use of these elements, for example, the heat exchangers described herein, often enhances the energy efficiency of the overall process. Other components may include polymeric membrane or adsorbent bed prepurifiers or postpurifiers. Such components and their operation are well known in the art and in the practice of gas separation and gas processing and their appropriate use in the present invention would be understood to those of skill in the art.

Specific features of the invention are shown in one or more of the drawings for convenience only, as each feature may be combined with other features in accordance with the invention. In addition, various changes and modifications may be made to the examples given without departing from the spirit of the invention. Alternative embodiments will be recognized by those skilled in the art and they are intended to be included within the scope of the claims.

What is claimed is:

1. A process for producing a diluted oxygen product gas stream having a concentration of oxygen of about 80% to about 99.7% oxygen by volume, comprising the steps of:
   a. separating a feed gas stream comprising air, using an ion transport module containing an ion transport membrane having a retentate side and a permeate side, into a retentate gas stream on the retentate side and an ultrapure oxygen gas stream emerging from the ion transport membrane into the permeate side;
   b. introducing a diluent gas into the permeate side through one or more conduits that extend from the retentate side of the ion transport module to the permeate side; and
   c. blending said ultrapure oxygen gas stream with said diluent gas to produce a diluted oxygen product gas stream having a concentration of oxygen of about 80% to about 99.7% oxygen by volume.

2. The process according to claim 1 wherein said one or more conduits are located within said ion transport membrane and wherein said diluent gas passes through said one or more conduits within said ion transport membrane.

3. The process according to claim 1 wherein said diluent gas consists of a portion of the feed gas, retentate gas, or mixtures thereof.

4. The process according to claim 1 wherein said diluent gas consists of an inert gas.

5. The process according to claim 4 wherein said inert gas is nitrogen.

6. The process according to claim 1 wherein blending of the ultrapure oxygen gas stream with the diluent gas occurs by introduction of the diluent gas at one or more points between said permeate side and the point at which the oxygen product stream passes through a downstream component.

7. A process for producing a diluted oxygen product gas stream having a concentration of oxygen of about 80% to about 99.7% oxygen by volume, comprising the steps of:

a. separating a feed gas stream comprising air, using an ion transport module containing an ion transport membrane having a retentate side and a permeate side, into a retentate gas stream on the retentate side and an ultrapure oxygen gas stream emerging from the ion transport membrane into the permeate side;

b. introducing a diluent gas into the permeate side by leakage of said diluent gas through one or more imperfect gas seals that are located at the points where the ion transport membrane is connected to the ion transport module, wherein the points of connection provide means for passage of said diluent gas from the retentate side of the ion transport module to the permeate side; and c. blending said ultrapure oxygen gas stream with said diluent gas to produce a diluted oxygen product gas stream having a concentration of oxygen of about 80% to about 99.7% oxygen by volume.

8. The process according to claim 7 wherein said diluent gas consists of a portion of the feed gas, retentate gas, or mixtures thereof.

9. The process according to claim 7 wherein said diluent gas consists of an inert gas.

10. The process according to claim 9 wherein said inert gas is nitrogen.

11. A process for producing a diluted oxygen product gas stream having a concentration of oxygen of about 80% to about 99.7% oxygen by volume, comprising the steps of:

a. separating a feed gas stream comprising air, using an ion transport module containing an ion transport membrane having a retentate side and a permeate side, into a retentate gas stream on the retentate side and an ultrapure oxygen gas stream emerging from the ion transport membrane into the permeate side;

b. introducing a diluent gas into the permeate side through one or more selectively permeable membranes that are selectively permeable to the diluent gas, that are located within said ion transport module and adjacent to said ion transport membrane, wherein said one or more selectively permeable membranes extend from the retentate side of the ion transport module to the permeate side; and c. blending said ultrapure oxygen gas stream with said diluent gas to produce a diluted oxygen product gas stream having a concentration of oxygen of about 80% to about 99.7% oxygen by volume.

12. The process according to claim 11 wherein said diluent gas consists of a portion of the feed gas, retentate gas, or mixtures thereof.

13. The process according to claim 11 wherein said diluent gas consists of an inert gas.

14. The process according to claim 13 wherein said inert gas is nitrogen.

15. A process for producing a diluted oxygen product gas stream having a concentration of oxygen of about 80% to about 99.7% oxygen by volume, comprising the steps of:

a. separating a feed gas stream comprising air, using an ion transport module containing an ion transport membrane having a retentate side and a permeate side, into a retentate gas stream on the retentate side and an ultrapure oxygen gas stream emerging from the ion transport membrane into the permeate side;

b. introducing a diluent gas into one or more areas near the permeate side of the ion transport membrane and upstream of a downstream component; and c. blending said ultrapure oxygen gas stream with said diluent gas to produce a diluted oxygen product gas stream having a concentration of oxygen of about 80% to about 99.7% oxygen by volume.

16. A process according to claim 15 wherein said introduction of the diluent gas and said blending of said ultrapure oxygen gas stream with said diluent gas occur downstream of said ion transport membrane and upstream of a downstream component.

* * * * *